(12) United States Patent
Smith

(10) Patent No.: US 7,798,129 B2
(45) Date of Patent: Sep. 21, 2010

(54) SHOT MODE TRANSITION METHOD FOR FUEL INJECTION SYSTEM

(75) Inventor: Michael David Smith, Huntingdon (GB)

(73) Assignee: Perkins Engines Company Limited, Peterborough (GB)

( * ) Notice: Subject to any disclaimer, the term of this patent is extended or adjusted under 35 U.S.C. 154(b) by 99 days.

(21) Appl. No.: 12/078,408

(22) Filed: Mar. 31, 2008

(65) Prior Publication Data

US 2009/0241909 A1   Oct. 1, 2009

(51) Int. Cl.
*F02D 41/30* (2006.01)

(52) U.S. Cl. ...................... 123/478; 123/480

(58) Field of Classification Search ......... 123/478–480, 123/299–300, 304–305; 701/101–105
See application file for complete search history.

(56) References Cited

U.S. PATENT DOCUMENTS

| | | | |
|---|---|---|---|
| 5,771,861 A | 6/1998 | Musser et al. | |
| 5,865,158 A | 2/1999 | Cleveland et al. | |
| 5,901,682 A | 5/1999 | McGee et al. | |
| 6,026,780 A | 2/2000 | Barnes et al. | |
| 6,082,331 A | 7/2000 | Barnes et al. | |
| 6,363,315 B1* | 3/2002 | Love et al. | 701/104 |
| 6,371,077 B1 | 4/2002 | McGee | |
| 6,415,762 B1 | 7/2002 | Hafner et al. | |
| 6,450,149 B1 | 9/2002 | McGee | |
| 6,636,797 B2* | 10/2003 | Yoshizawa et al. | 701/104 |
| 6,705,278 B2 | 3/2004 | McGee et al. | |
| 6,725,838 B2 | 4/2004 | Shafer et al. | |
| 6,843,221 B2 | 1/2005 | McGee et al. | |
| 6,863,056 B2 | 3/2005 | Hafner et al. | |
| 6,966,040 B2 | 11/2005 | Ismailov | |
| 7,051,699 B2 | 5/2006 | McGee et al. | |
| 7,296,555 B2* | 11/2007 | Tamma et al. | 123/304 |
| 7,422,000 B2 | 9/2008 | Kesse et al. | |
| 2002/0195081 A1 | 12/2002 | McGee et al. | |
| 2004/0200458 A1 | 10/2004 | Lewis et al. | |
| 2007/0295307 A1 | 12/2007 | Kerns | |
| 2008/0162019 A1 | 7/2008 | Carlill et al. | |
| 2008/0201060 A1 | 8/2008 | Nagai | |

OTHER PUBLICATIONS

U.S. Appl. No. 12/078,429, titled "Method for Operating Fuel Injection System," filed Mar. 31, 2008 with Applicant Michael David Smith et al. (25 pages).
Office Action of U.S. Appl. No. 12/078,429, mailed on Apr. 29, 2009 (12 pages).

* cited by examiner

*Primary Examiner*—Stephen K Cronin
*Assistant Examiner*—Johnny H Hoang
(74) *Attorney, Agent, or Firm*—Finnegan, Hendersonm, Farabow, Garrett & Dunner LLC

(57) ABSTRACT

A fuel injection system for a combustion engine is disclosed. The fuel injection system may have a fuel injector configured to inject fuel in one of a first shot mode and a second shot mode. Additionally, the fuel injection system may have a sensor configured to sense a parameter indicative of a desired rate of change of a supplied fuel quantity and generate a corresponding signal. The fuel injection system may also have a controller in communication with the fuel injector and the sensor. The controller may be configured to operate the fuel injector in one of the first shot mode and the second shot mode during an injection event, based on a count and the signal.

20 Claims, 2 Drawing Sheets

SHOT MODE TRANSITION METHOD FOR FUEL INJECTION SYSTEM

TECHNICAL FIELD

The present disclosure relates generally to a shot mode transition method and, more particularly, to a method of transitioning between operating a fuel injection system in a first shot mode and operating the fuel injection system in a second shot mode.

BACKGROUND

Electronically controlled direct fuel injection devices are well known in the art. Such devices include electronically controlled fuel injectors, which may be hydraulically or mechanically actuated. During an injection event, an electronically controlled fuel injector injects fuel into a combustion chamber in response to an electronic fuel injection signal produced by a controller. This signal includes a waveform indicative of an injection rate. The fuel injection waveform is tailored based on engine operating conditions. Specifically, the fuel injection waveform is tailored to include multiple fuel injections (hereafter "shots") during each injection event. This use of multiple shots during each injection event may enable compliance with exhaust emissions regulations. These regulations restrict, for example, the emission of hydrocarbons and carbon monoxide, the release of particulates, and the release of nitrogen oxides (NOx). Each shot has specific attributes such as, for example, a duration and an injection rate. Shots are grouped, ordered, and timed to form shot modes, which correspond to fuel injection waveforms. Based on an engine speed and a desired quantity of fuel supplied to the engine, a shot mode is selected for each injection event. At different engine operating conditions, different shot modes are selected to achieve desired engine performances while complying with emissions regulations.

During normal operation of the engine, the selected shot mode may change several times. Typically, shot modes differ slightly in both noise level and torque produced. In some instances, transitioning from one shot mode to another causes a noticeable "step-change" in either or both of these characteristics and/or other characteristics. This sudden change in characteristics is undesirable.

One way to minimize the sudden change in characteristics is described in U.S. Pat. No. 7,051,699 (the '699 patent) issued to McGee et al on May 30, 2006. The '699 patent describes methods for operating a fuel injection system of an engine. Specifically, the methods include operating a first number of fuel injectors in a first mode during a first engine cycle. The first mode has a first set of fuel delivery characteristics, including at least one fuel shot per fuel injector per engine cycle. The methods also include operating a second number of the fuel injectors in a second mode during the first engine cycle. The second mode has a second set of fuel delivery characteristics, including at least one fuel shot per fuel injector per engine cycle.

Although the methods of the '699 patent may lessen the noticeability of a transition between the two modes of the '699 patent, the methods of the '699 patent may do little to dynamically control a rate of transition between the two modes. Failing to dynamically control the rate of transition between the two modes may result in an undesirable tradeoff between transition noticeability and a responsiveness of the engine of the '699 patent. For example, it may sometimes be desirable to minimize the noticeability of the transition between the two modes. This may be best accomplished by a slow transition between the two modes. It may at other times be desirable to maximize the responsiveness of the engine. This may be best accomplished by a fast transition between the two modes.

The disclosed method and system are directed to improving prior systems.

SUMMARY

In one aspect, the present disclosure may be directed to a method of transitioning from operating a fuel injection system in a first shot mode to operating the fuel injection system in a second shot mode. The method may include receiving a signal indicative of a desired rate of change of a supplied fuel quantity. The method may also include operating a fuel injector of the fuel injection system in one of the first shot mode and the second shot mode during an injection event, based on a count and the signal.

In another aspect, the present disclosure may be directed to a method of transitioning from operating a fuel injection system in a first shot mode to operating the fuel injection system in a second shot mode. The method may include receiving a signal indicative of a desired rate of change of a supplied fuel quantity. Additionally, the method may include initializing a count variable. The method may also include firstly selecting one of the first shot mode and the second shot mode, based on the initialized count variable and the signal. In addition, the method may include firstly injecting a first quantity of fuel, based on the firstly selected one of the first shot mode and the second shot mode. The method may also include adjusting the count variable. Additionally, the method may include secondly selecting one of the first shot mode and the second shot mode, based on the adjusted count variable and the signal. The method may also include secondly injecting a second quantity of fuel, based on the secondly selected one of the first shot mode and the second shot mode.

In yet another aspect, the present disclosure may be directed to a fuel injection system for a combustion engine. The fuel injection system may include a fuel injector configured to inject fuel in one of a first shot mode and a second shot mode. Additionally, the fuel injection system may include a sensor configured to sense a parameter indicative of a desired rate of change of a supplied fuel quantity and generate a corresponding signal. The fuel injection system may also include a controller in communication with the fuel injector and the sensor. The controller may be configured to operate the fuel injector in one of the first shot mode and the second shot mode during an injection event, based on a count and the signal.

DETAILED DESCRIPTION

Figure 1:
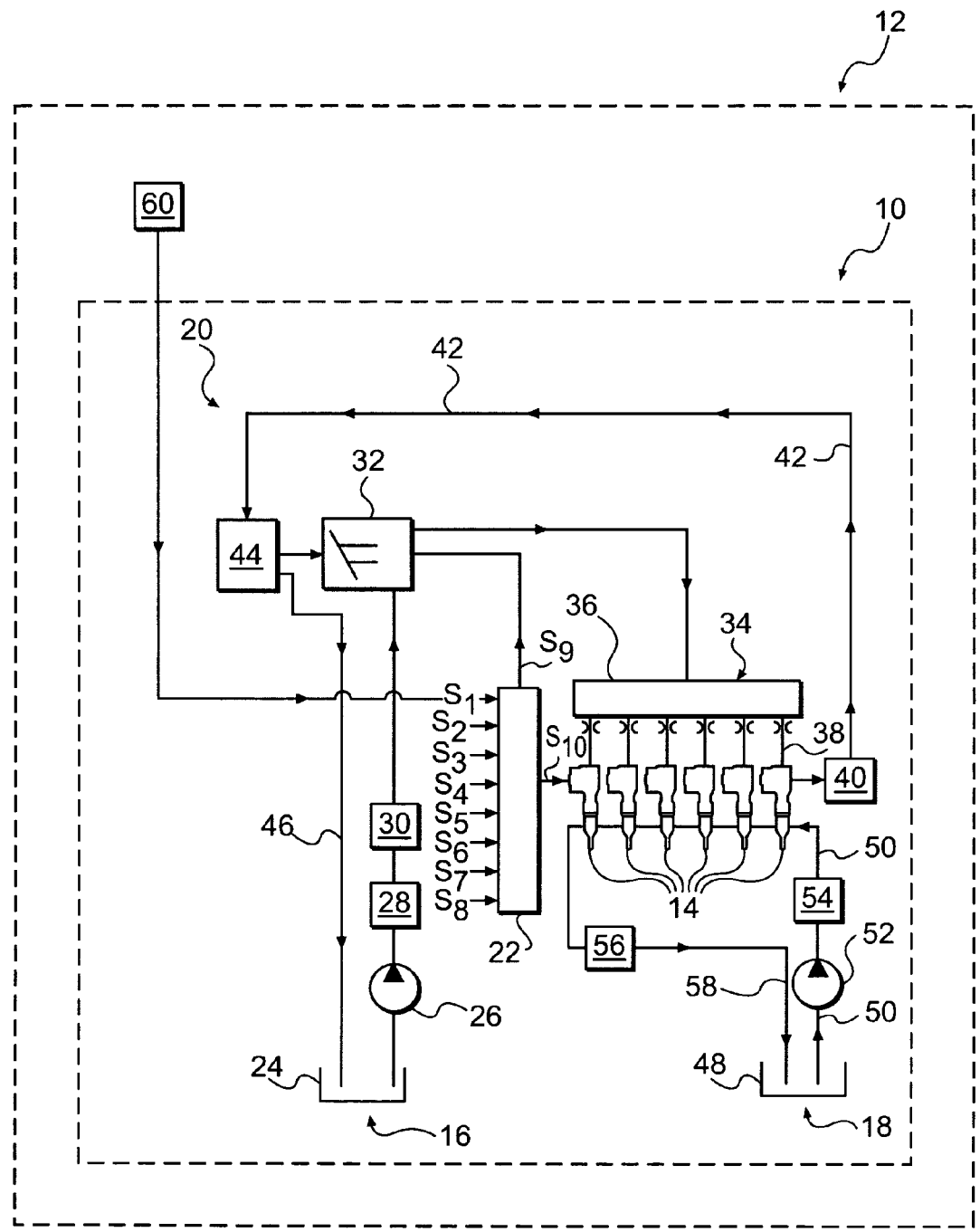
FIG. 1 is a diagrammatic illustration of an exemplary disclosed fuel injection system.

FIG. 1 illustrates a hydraulically actuated electronically controlled fuel injection system 10 (hereafter "fuel injection system 10") for a combustion engine 12. Combustion engine 12 may be utilized by various types of machines such as, for example, fixed or mobile machines that perform some type of operation associated with an industry such as mining, construction, farming, transportation, power generation, tree harvesting, forestry, or another industry known in the art. Combustion engine 12 may be an internal combustion engine, such as, for example, a diesel engine or a gasoline engine. While FIG. 1 illustrates combustion engine 12 as an in-line six cylinder engine, it is contemplated that combustion engine 12 may be a V-type engine or a rotary engine. Additionally, it is contemplated that combustion engine 12 may contain any number of cylinders or combustion chambers (not shown).

Fuel injection system 10 may include one or more electronically controlled fuel injection devices. For example, fuel injection system 10 may include one or more fuel injectors 14, which may each be situated to inject fuel into a combustion chamber of combustion engine 12. While FIG. 1 illustrates fuel injectors 14 as hydraulically actuated, it is contemplated that fuel injectors 14 may be mechanically or electronically actuated.

Fuel injection system 10 may also include an actuation fluid supply apparatus 16 for supplying an actuation fluid to each fuel injector 14. In addition, fuel injection system 10 may include a fuel supply apparatus 18 for supplying a quantity of fuel to each fuel injector 14. Fuel injection system 10 may also include an actuation fluid recirculation system 20 for recirculating the actuation fluid and/or recovering hydraulic energy from the actuation fluid leaving each fuel injector 14. Additionally, fuel injection system 10 may include a controller 22 for controlling the operation of fuel injection system 10. For example, controller 22 may control how fuel is injected by fuel injectors 14. Specifically, controller 22 may determine a shot mode for use during an injection event. The shot mode may include a group of shots, which are ordered and timed to achieve a desired engine performance while complying with emissions regulations. It is contemplated that the group of shots may comprise one or more shots. Each shot may have specific attributes such as, for example, a duration and an injection rate. The attributes of the shot(s) included in a group may dictate a specific set of fuel delivery characteristics for the shot mode. These fuel delivery characteristics may include, for example, a noise level and a torque-production level. The injection event may include all of the shots that occur in a particular cylinder or combustion chamber during one cycle of combustion engine 12.

Actuation fluid supply apparatus 16 may include an actuation fluid reservoir 24, a low pressure actuation fluid pump 26, an actuation fluid cooler 28, an actuation fluid filter 30, a high pressure actuation fluid pump 32, and an actuation fluid rail 34. Actuation fluid rail 34 may include a common rail passage 36, which may be arranged in fluid communication with an outlet from high pressure actuation fluid pump 32. Actuation fluid rail 34 may also include one or more rail branch passages 38, each of which may connect an actuation fluid inlet of one fuel injector 14 to common rail passage 36. If fuel injector 14 is mechanically actuated, actuation fluid rail 34 may be replaced with a cam actuating arrangement or other mechanical means of actuation.

Actuation fluid recirculation system 20 may include one or more waste accumulating fluid control valves 40, each of which may be connected to an actuation fluid drain of one fuel injector 14 (only shown by way of example). The actuation fluid leaving the one or more waste accumulating control valves 40 may enter recirculation line 42, which may be connected to a hydraulic motor 44. Hydraulic motor 44 may channel a first portion of the actuation fluid to high pressure actuation fluid pump 32. And, hydraulic motor 44 may return a second portion of the actuation fluid to actuation fluid reservoir 24 via recirculation line 46.

It is contemplated that fuel injection system 10 may be connected as a parasitic subsystem to a lubricating oil circulation system of combustion engine 12. In such a case, the actuation fluid may be engine lubricating oil and actuation fluid reservoir 24 may be an engine lubrication oil sump. Alternatively, fuel injection system 10 may not be a parasitic subsystem, and the actuation fluid may be a fuel or another suitable liquid.

Fuel supply apparatus 18 may include a fuel tank 48. Fuel supply apparatus 18 may also include a fuel supply passage 50, which may be arranged in fluid communication between fuel tank 48 and a fuel inlet of each fuel injector 14. Additionally, fuel supply apparatus 18 may include a low pressure fuel pump 52, a fuel filter 54, and a fuel supply regulating valve 56. Fuel supply apparatus 18 may also include a fuel circulation and return passage 58, which may be arranged in fluid communication between each fuel injector 14 and fuel tank 48.

Controller 22 may embody, for example, an engine control module, and may include means for monitoring, recording, storing, indexing, processing, and/or communicating information. These means may include, for example, a counter, a memory, one or more data storage devices, a central processing unit, and/or another component that may be used to run the disclosed applications. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM. The memory may store, for example, instruction sets, maps, lookup tables, and variables.

Controller 22 may receive a plurality of sensor input signals such as, for example, $S_1$ thru $S_8$, which correspond to sensor inputs. These sensor inputs may be indicative of operating conditions of combustion engine 12 such as, for example, a speed of combustion engine 12, a temperature of combustion engine 12, an actuation fluid pressure of combustion engine 12, or a piston position of combustion engine 12; a desired supplied fuel quantity to each fuel injector 14 (hereafter "desired supplied fuel quantity"); a desired rate of change of the supplied fuel quantity to each fuel injector 14 (hereafter "desired rate of change of the supplied fuel quantity"); fuel delivery characteristics of a shot mode; and/or other inputs, which controller 22 may use to determine the shot mode for use during the injection event. For example, a signal designated by $S_1$ in FIG. 1 may be indicative of the desired rate of change of the supplied fuel quantity and may be communicated by a throttle sensor 60. The desired rate of change of the supplied fuel quantity may be related to a sensed actuation position of a manually operated throttle device (not shown). Alternatively, signal $S_1$ may be internal to controller 22 and the desired rate of change of the supplied fuel quantity may be determined by a closed loop calculation or other automatic calculation. This closed loop calculation or other automatic calculation may be related to a signal designated by $S_2$ in FIG. 1. Signal $S_2$ may be indicative of a desired speed or other operational parameter of combustion engine 12 and may be communicated by throttle sensor 60. The desired speed or other operational parameter of combustion engine 12 may be related to the sensed actuation position of the manually operated throttle device. In yet another alternative, the closed loop calculation or other automatic calculation may be unrelated to signal $S_2$ and may be performed during operation of an autonomous vehicle.

Based on the determined shot mode for use during the injection event, controller 22 may generate control signal $S_9$ and fuel injection signal $S_{10}$. Signal $S_9$ may control the actuation fluid pressure from high pressure actuation fluid pump 32. And, signal $S_{10}$ may control the injection of fuel by fuel injector 14. Specifically, signal $S_{10}$ may include a waveform indicative of an injection rate of fuel by fuel injector 14.

While FIG. 1 illustrates fuel injection system 10 as being hydraulically actuated and electronically controlled, it is contemplated that the systems and methods disclosed herein may be equally applicable to a common rail fuel injection system (not shown). The common rail fuel injection system may differ from fuel injection system 10 in that it may not include both of actuation fluid supply apparatus 16 and actuation fluid recirculation system 20. Instead, the common rail fuel injection system may include a common rail, which may connect fuel supply passage 50 to the fuel inlet of each fuel injector 14. Fuel within the common rail may be pressurized by a high pressure pump. A flow of this pressurized fuel into the fuel inlet of each fuel injector 14 may be controlled by a valve within each respective fuel injector 14. The opening of these valves may be controlled by signal $S_{10}$ and may in turn control the injection of fuel by fuel injectors 14. If the pressure within the common rail exceeds a certain threshold, a fuel supply regulating valve fluidly coupled to the common rail may be opened to allow fuel from the common rail to flow to fuel tank 48 by way of a return passage.

Figure 2:
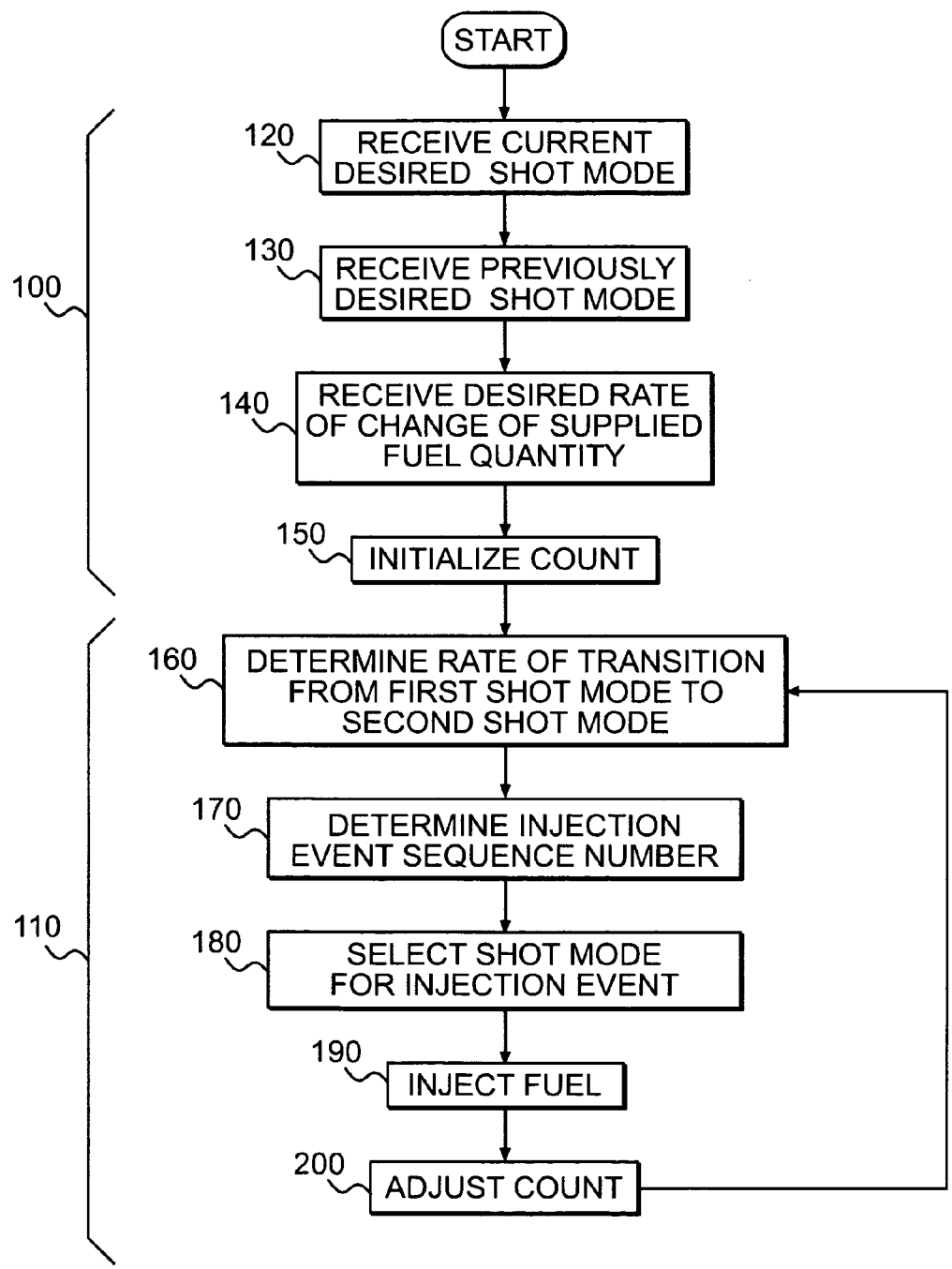
FIG. 2 is a flow chart describing an exemplary method of operating the fuel injection system of FIG. 1.

FIG. 2 illustrates an exemplary method of operating fuel injection system 10. FIG. 2 will be discussed in the following section to further illustrate fuel injection system 10 and its operation.

INDUSTRIAL APPLICABILITY

The disclosed fuel injection system may be applicable to combustion engines, which may operate in one of two or more shot modes. The system may transition from a first one of the two or more shot modes to a second one of the two or more shot modes. In particular, the system may receive a desired rate of change of a supplied fuel quantity, and transition from the first shot mode to the second shot mode, based on this desired rate of change of the supplied fuel quantity. Operation of the system will now be described.

As illustrated in FIG. 2, operation of fuel injection system 10 may commence at a step 100, which may include initialization of controller 22. Based on this initialization, controller 22 may transition between two shot modes (step 110).

The initialization of step 100 may involve populating the memory of controller 22. It is contemplated that this initialization may be performed each time a desired shot mode changes. The desired shot mode may change when the desired supplied fuel quantity changes. It is also contemplated that the initialization of step 100 may include sub-steps, each sub-step taking place when or after the desired shot mode changes. For example, controller 22 may receive a currently desired shot mode (sub-step 120). Simultaneously with, before, or after sub-step 120, controller 22 may also receive a previously desired shot mode (sub-step 130). Additionally, and simultaneously with, before, or after sub-step 130, controller 22 may receive the desired rate of change of the supplied fuel quantity (sub-step 140). Simultaneously with, before, or after sub-step 140, controller 22 may also initialize a count (sub-step 150). In particular, controller 22 may store in its memory for later use the count, which may be a number variable such as, for example, zero.

The receiving of sub-step 120 may be based on one of signals $S_2$ thru $S_8$. In particular controller 22 may receive one of signals S2 thru $S_8$. This received signal (hereafter "signal A") may be from another controller or component (not shown) of combustion engine 12. Signal A may represent fuel delivery characteristics of the currently desired shot mode (hereafter the "second shot mode"). Controller 22 may store in its memory for later use the fuel delivery characteristics of the second shot mode. Alternatively, signal A may not represent the fuel delivery characteristics of the second shot mode. Instead, signal A may represent, for example, operating conditions of combustion engine 12 and/or the desired supplied fuel quantity. And, controller 22 may determine the fuel delivery characteristics of the second shot mode, based on the operating conditions of combustion engine 12 and/or the desired supplied fuel quantity. Controller 22 may then store in its memory for later use these fuel delivery characteristics of the second shot mode.

The receiving of sub-step 130 may also be based on one of signals $S_2$ thru $S_8$. In particular controller 22 may receive one of signals $S_2$ thru $S_8$. This received signal (hereafter "signal B") may be from another controller or component (not shown) of combustion engine 12. Signal B may represent fuel delivery characteristics of the previously desired shot mode (hereafter the "first shot mode"). Controller 22 may store in its memory for later use the fuel delivery characteristics of the first shot mode. Alternatively, signal B may not represent the fuel delivery characteristics of the first shot mode. Instead, signal B may represent, for example, previous operating conditions of combustion engine 12 and/or a previously desired supplied fuel quantity. And, controller 22 may determine the fuel delivery characteristics of the first shot mode, based on the previous operating conditions of combustion engine 12 and/or the previously desired supplied fuel quantity. Controller 22 may then store in its memory for later use these fuel delivery characteristics of the first shot mode. In yet another alternative, if sub-step 130 takes place before sub-step 120 and controller 22 has previously stored in its memory the fuel delivery characteristics of the second shot mode (e.g., during a previous transition between shot modes), controller 22 may retrieve from its memory the fuel delivery characteristics of the second shot mode. Controller 22 may then store these fuel delivery characteristics in its memory for later use as the fuel delivery characteristics of the first shot mode.

The receiving of sub-step 140 may be based on signal $S_1$. In particular, controller 22 may receive signal $S_1$. Signal $S_1$ may be indicative of the desired rate of change of the supplied fuel quantity. Controller 22 may store in its memory for later use this desired rate of change of the supplied fuel quantity. Signal $S_1$ may be received from throttle sensor 60. Alternatively, signal $S_1$ may be internal to and determined by controller 22. This determination may include a closed loop calculation or other automatic calculation. This closed loop calculation or other automatic calculation may be related to a signal $S_2$, which controller 22 may receive from throttle sensor 60. In yet another alternative, the closed loop calculation or other automatic calculation may be unrelated to signal $S_2$ and may be performed during operation of an autonomous vehicle.

The transitioning of step 110 may also include sub-steps. For example, controller 22 may determine a rate of transition from the first shot mode to the second shot mode (sub-step 160). Simultaneously with, before, or after sub-step 160, controller 22 may also determine an injection event sequence number (sub-step 170). Based on the determinations of sub-steps 160 and 170, controller 22 may select one of the first and second shot modes for use during an injection event (sub-step 180). Controller 22 may then operate fuel injector 14 to inject a quantity of fuel into a cylinder or combustion chamber of combustion engine 12 in accordance with the selected one of the first and second shot modes (sub-step 190). Simultaneously with, before, or after sub-step 190, controller 22 may adjust the count stored in its memory (sub-step 200). This adjustment may include incrementing the count. Alternatively, the adjustment may include updating the count to reflect a passage of time. Controller 22 may then repeat step 110 until the transition between the first shot mode and the second shot mode is complete (i.e. until every fuel injector is permanently operating in the second shot mode). It is contemplated that each time controller 22 repeats sub-step 190, controller 22 may operate a different fuel injector 14. It is also contemplated that once controller 22 has operated every fuel injector 14, controller 22 may again operate previously operated fuel injectors 14 during sub-step 190.

The determination of sub-step 160 may include accessing a lookup table such as, for example, table 1, which may be stored in the memory of controller 22. Table 1 may be in the form of a table, graph, equation, or other memory structure capable of storing relational information. For example, table 1 may relate the rate of transition from the first shot mode to the second shot mode, the count, and the desired rate of change of the supplied fuel quantity. It is contemplated that these relations may vary depending on the makeup and use of combustion engine 12. It is also contemplated that table 1 may or may not include only discrete values. For example, table 1, as depicted below, may include only counts that are multiples of 80 and desired rates of change of the supplied fuel quantity that are multiples of 10 mm^3/s.

TABLE 1

| Desired Rate of Change of the Supplied Fuel Quantity (mm^3/s) | Count | | | | | | | | | | |
|---|---|---|---|---|---|---|---|---|---|---|---|
| | 0 | 80 | 160 | 240 | 320 | 400 | 480 | 560 | 640 | 720 | 800 |
| 0 | 1 | 0.9 | 0.8 | 0.6 | 0.5 | 0.4 | 0.3 | 0.1 | 0 | 0 | 0 |
| 10 | 1 | 0.8 | 0.5 | 0.3 | 0 | 0 | 0 | 0 | 0 | 0 | 0 |
| 20 | 1 | 0.7 | 0.3 | 0 | 0 | 0 | 0 | 0 | 0 | 0 | 0 |
| 30 | 1 | 0.5 | 0 | 0 | 0 | 0 | 0 | 0 | 0 | 0 | 0 |
| 40 | 0.5 | 0 | 0 | 0 | 0 | 0 | 0 | 0 | 0 | 0 | 0 |
| 50 | 0 | 0 | 0 | 0 | 0 | 0 | 0 | 0 | 0 | 0 | 0 |

Therefore, controller 22 may interpolate the rate of transition from the first shot mode to the second shot mode (hereafter "the rate of transition") based on the count and the desired rate of change of the supplied fuel quantity. It is contemplated that the rate of transition may be interpolated to a value including one decimal place. Specifically, controller 22 may first interpolate the rate of transition with respect to the count. Controller 22 may then interpolate the rate of transition with respect to the desired rate of change of the supplied fuel quantity. Alternatively, controller 22 may first interpolate the rate of transition with respect to the desired rate of change of the supplied fuel quantity and then interpolate the rate of transition with respect to the count. It is contemplated that after each interpolation, the interpolated rate of transition may be rounded to one decimal place. This rounding may include rounding up to the nearest decimal place, rounding down to the nearest decimal place, or rounding to the nearest decimal place. Alternatively, only the last interpolated rate of transition may be rounded to one decimal place.

The interpolation with respect to the count may include determining the relative closeness of the count to each of nearest two counts included in table 1. The interpolation with respect to the count may also include weighting the rates of transition of each of these nearest two counts in accordance with the determined relative closenesses. The interpolation with respect to the count may be expressed by the formula $$R_C = R_{C1}\left(\frac{C2 - C}{C2 - C1}\right) + R_{C2}\left(\frac{C - C1}{C2 - C1}\right),$$

where $R_C$ represents the interpolated rate of transition with respect to the count, C represents the count, C1 represents the smaller of the nearest two counts included in table 1, C2 represents the larger of the nearest two counts included in table 1, $R_{C1}$ represents the rate of transition at C1, and $R_{C2}$ represents the rate of transition at C2. For example, if the count is 275, the interpolated rate of transition with respect to the count for a desired rate of change of the supplied fuel quantity of 10 may be $$R_C = 0.3\left(\frac{320 - 275}{320 - 240}\right) + 0\left(\frac{275 - 240}{320 - 240}\right) = 0.16875.$$

As another example, if the count is 275, the interpolated rate of transition with respect to the count for a desired rate of change of the supplied fuel quantity of 20 may be $$R_C = 0\left(\frac{320 - 275}{320 - 240}\right) + 0\left(\frac{275 - 240}{320 - 240}\right) = 0.$$

The interpolation with respect to the desired rate of change of the supplied fuel quantity may include determining the relative closeness of the desired rate of change of the supplied fuel quantity to each of nearest two desired rates of change of the supplied fuel quantity included in table 1. The interpolation with respect to the desired rate of change of the supplied fuel quantity may also include weighting the rates of transition of each of these nearest two desired rates of change of the supplied fuel quantity in accordance with the determined relative closenesses. The interpolation with respect to the desired rate of change of the supplied fuel quantity may be expressed by the formula $$R_S = R_{S1}\left(\frac{S2 - S}{S2 - S1}\right) + R_{S2}\left(\frac{S - S1}{S2 - S1}\right),$$

where $R_S$ represents the interpolated rate of transition with respect to the desired rate of change of the supplied fuel quantity, S represents the desired rate of change of the supplied fuel quantity, S1 represents the smaller of the nearest two desired rates of change of the supplied fuel quantity included in table 1, S2 represents the larger of the nearest two desired rates of change of the supplied fuel quantity included in table 1, $R_{S1}$ represents the rate of transition at S1, and $R_{S2}$ represents the rate of transition at S2. For example, if the count is 275 and the desired rate of change of the supplied fuel quantity is 13, the interpolated rate of transition with respect to the desired rate of change of the supplied fuel quantity may be $$R_S = 0.16875\left(\frac{20-13}{20-10}\right) + 0\left(\frac{13-10}{20-10}\right) = 0.118125.$$

As previously discussed, this interpolated rate of transition may be rounded to the nearest decimal place. For example, 0.118125 may be rounded to 0.1. In other words, out of every 10 injection events, controller 22 may operate fuel injector 14 in the first shot mode for 1 injection event and controller 22 may operate fuel injector 14 in the second shot mode for 9 injection events.

The determination of sub-step 170 may include a modulo operation. In particular controller 22 may determine the injection event sequence number by performing a modulo operation, which may include the count. For example, controller 22 may determine the injection event sequence number using the formula #=c mod(d)+1, where # is the injection event sequence number, c is the count, mod is the modulo operator, and d is the divisor. It is contemplated that the divisor may be any number other than 0. For example, the divisor may be 10.

The selection of sub-step 180 may include accessing a lookup table such as, for example, table 2, which may be stored in the memory of controller 22. Table 2 may be in the form of a table, graph, equation, or other memory structure capable of storing relational information. For example, table 2 may relate the selected shot mode, the rate of transition from the first shot mode to the second shot mode, and the injection event sequence number. It is contemplated that these relations may vary depending on the makeup and use of combustion engine 12. It is also contemplated that these relations may correspond to all possible combinations of the determinations of sub-steps 150 and 160. For example, table 2, as depicted below, may include injection event sequence numbers 1 thru 10. Table 2 may also include each possible rate of transition from the first shot mode to the second shot mode.

Controller 22 may lookup and store for later use the selected one of the first shot mode and the second shot mode, based on the rate of transition from the first shot mode to the second shot mode and the injection event sequence number. For example, if the rate of transition from the first shot mode to the second shot mode is 0.4 and the injection event sequence number is 8, the selected one of the first shot mode and the second shot mode may be the second shot mode. As another example, if the rate of transition from the first shot mode to the second shot mode is 0.9 and the injection event sequence number is 2, the selected one of the first shot mode and the second shot mode may be the first shot mode.

It is contemplated that the transitioning of step 110 may dynamically adapt to different desired operational parameters of combustion engine 12. In particular, controller 22 may dynamically control the rate of transition between the first shot mode and the second shot mode. This dynamically controlled rate may adapt to different desired rates of change of the supplied fuel quantity. Thus, if the desired rate of change of the supplied fuel quantity is high (i.e. if it is desirable to maximize the responsiveness of combustion engine 12), the rate of transition between the first shot mode and the second shot mode may be fast. But, if the desired rate of change of the supplied fuel quantity is low (i.e. if it is desirable to minimize the noticeability of the transition between the first shot mode and the second shot mode), the rate of transition between the first shot mode and the second shot mode may be low.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A method of operating a fuel injection system, comprising:

operating the fuel injection system in a first shot mode;

transitioning from operating the fuel injection system in the first shot mode to operating the fuel injection system in a second shot mode, wherein the transitioning includes:

receiving a signal indicative of a desired rate of change of a supplied fuel quantity;

TABLE 2

| Injection Event Sequence Number | Rate of Transition From the First Shot Mode to the Second Shot Mode | | | | | | | | | | |
|---|---|---|---|---|---|---|---|---|---|---|---|
|  | 1 | 0.9 | 0.8 | 0.7 | 0.6 | 0.5 | 0.4 | 0.3 | 0.2 | 0.1 | 0 |
| 1 | 1st | $2^{nd}$ | 2nd | 2nd | 1st | 2nd | 2nd | 2nd | 2nd | 2nd | 2nd |
| 2 | 1st | $1^{st}$ | 1st | 1st | 1st | 1st | 2nd | 1st | 2nd | 2nd | 2nd |
| 3 | 1st | $1^{st}$ | 1st | 1st | 2nd | 2nd | 1st | 2nd | 2nd | 2nd | 2nd |
| 4 | 1st | $1^{st}$ | 1st | 1st | 1st | 1st | 2nd | 2nd | 1st | 2nd | 2nd |
| 5 | 1st | $1^{st}$ | 1st | 2nd | 1st | 2nd | 2nd | 1st | 2nd | 1st | 2nd |
| 6 | 1st | $1^{st}$ | 2nd | 1st | 2nd | 1st | 1st | 2nd | 2nd | 2nd | 2nd |
| 7 | 1st | $1^{st}$ | 1st | 1st | 1st | 2nd | 1st | 2nd | 2nd | 2nd | 2nd |
| 8 | 1st | $1^{st}$ | 1st | 1st | 1st | 1st | 2nd | 1st | 1st | 2nd | 2nd |
| 9 | 1st | $1^{st}$ | 1st | 2nd | 2nd | 2nd | 2nd | 2nd | 2nd | 2nd | 2nd |
| 10 | 1st | $1^{st}$ | 1st | 1st | 1st | 1st | 1st | 2nd | 2nd | 2nd | 2nd | operating a first fuel injector of the fuel injection system in one of the first shot mode or the second shot mode during a first injection event, based on a count and the signal.

2. The method of claim 1, wherein operating the first fuel injector of the fuel injection system in one of the first shot mode or the second shot mode during the first injection event includes adjusting the count.

3. The method of claim 2, wherein adjusting the count includes incrementing the count.

4. The method of claim 2, further including operating a second fuel injector of the fuel injection system in one of the first shot mode or the second shot mode during a second injection event, based on the adjusted count and the signal.

5. The method of claim 1, wherein operating the first fuel injector of the fuel injection system in one of the first shot mode or the second shot mode during the first injection event includes determining a rate of the transition from the first shot mode to the second shot mode, based on the count and the signal.

6. The method of claim 5, wherein determining the rate of the transition from the first shot mode to the second shot mode includes accessing a first lookup table.

7. The method of claim 5, wherein operating the first fuel injector of the fuel injection system in one of the first shot mode or the second shot mode during the first injection event includes determining an injection event sequence number, based on the count.

8. The method of claim 7, wherein determining the injection event sequence number includes a modulo operation, the modulo operation including the count.

9. The method of claim 7, wherein operating the first fuel injector of the fuel injection system in one of the first shot mode or the second shot mode during the first injection event includes selecting one of the first shot mode or the second shot mode, based on the determined injection event sequence number and the determined rate of the transition from the first shot mode to the second shot mode.

10. The method of claim 9, wherein selecting one of the first shot mode or the second shot mode includes accessing a second lookup table.

11. The method of claim 9, wherein operating the first fuel injector of the fuel injection system in one of the first shot mode or the second shot mode during the first injection event includes injecting a quantity of fuel, based on the selected one of the first shot mode and the second shot mode.

12. The method of claim 1, wherein the first shot mode includes a first set of fuel delivery characteristics and the second shot mode includes a second set of fuel delivery characteristics different from the first set of fuel delivery characteristics.

13. A method of operating a fuel injection system, comprising:
operating the fuel injection system in a first shot mode;
transitioning from operating the fuel injection system in the first shot mode to operating the fuel injection system in a second shot mode, wherein the transitioning includes:
receiving a signal indicative of a desired rate of change of a supplied fuel quantity;
initializing a count variable;
firstly selecting one of the first shot mode or the second shot mode, based on the initialized count variable and the signal;
firstly injecting a first quantity of fuel, based on the firstly selected one of the first shot mode or the second shot mode;
adjusting the count variable;
secondly selecting one of the first shot mode or the second shot mode, based on the adjusted count variable and the signal; and
secondly injecting a second quantity of fuel, based on the secondly selected one of the first shot mode or the second shot mode.

14. The method of claim 13, wherein the adjustment of the count variable includes incrementing the count variable.

15. The method of claim 13, wherein:
the firstly selected one of the first shot mode or the second shot mode is the first shot mode; and
the secondly selected one of the first shot mode or the second shot mode is the second shot mode.

16. The method of claim 13, wherein the first shot mode includes a first set of fuel delivery characteristics and the second shot mode includes a second set of fuel delivery characteristics different from the first set of fuel delivery characteristics.

17. The method of claim 13, wherein:
the firstly selection of one of the first shot mode or the second shot mode includes determining a first rate of the transition from the first shot mode to the second shot mode, based on the initialized count variable and the signal; and
the secondly selection of one of the first shot mode or the second shot mode includes determining a second rate of the transition from the first shot mode to the second shot mode, based on the adjusted count variable and the signal.

18. The method of claim 13, further including:
repeating the adjustment of the count variable;
thirdly selecting one of the first shot mode or the second shot mode, based on the repeatedly adjusted count variable and the signal; and
thirdly injecting a third quantity of fuel, based on the thirdly selected one of the first shot mode or the second shot mode.

19. A fuel injection system for a combustion engine, comprising:
a first fuel injector configured to inject fuel in a first shot mode and a second shot mode;
a sensor configured to sense a parameter indicative of a desired rate of change of a supplied fuel quantity and generate a corresponding signal; and
a controller in communication with the first fuel injector and the sensor, and configured to operate the first fuel injector in the first shot mode, the controller also being configured to operate the first fuel injector in the second shot mode, wherein the controller is configured to transition from the first shot mode to the second shot mode by operating the first fuel injector in one of the first shot mode or the second shot mode during a first injection event, based on a count and the signal.

20. The fuel injection system of claim 19, further including a second fuel injector configured to inject fuel in one of the first shot mode and the second shot mode, wherein the controller is in further communication with the second fuel injector and is further configured to:
adjust the count; and
operate the second fuel injector in one of the first shot mode or the second shot mode during a second injection event, based on the adjusted count and the signal.

* * * * *